United States Patent
Sawada (10) Patent No.: US 10,974,652 B2
(45) Date of Patent: Apr. 13, 2021

(54) IMAGING UNIT FOR VEHICLE

(71) Applicant: HONDA MOTOR CO., LTD., Tokyo (JP)

(72) Inventor: Makoto Sawada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/882,909

(22) Filed: May 26, 2020

(65) Prior Publication Data
US 2020/0384923 A1    Dec. 10, 2020

(30) Foreign Application Priority Data
May 30, 2019    (JP) .............................. JP2019-101110

(51) Int. Cl.
*B60R 1/08* (2006.01)
*B60R 1/12* (2006.01)

(52) U.S. Cl.
CPC ........ *B60R 1/12* (2013.01); *B60R 2001/1253* (2013.01); *B60R 2300/105* (2013.01); *B60R 2300/8026* (2013.01); *B60R 2300/8046* (2013.01)

(58) Field of Classification Search
CPC ............................................. B60R 2001/1253
USPC ....................................................... 362/494
See application file for complete search history.

(56) References Cited

U.S. PATENT DOCUMENTS

| | | | |
|---|---|---|---|
| 5,786,772 A * | 7/1998 | Schofield .......... | B60R 21/01564 340/903 |
| 2010/0165100 A1* | 7/2010 | Asai .......................... | B60R 1/06 348/135 |
| 2010/0196000 A1* | 8/2010 | Watanabe ................. | B60R 1/12 396/429 |
| 2012/0314075 A1 | 12/2012 | Cho | |
| 2014/0036079 A1* | 2/2014 | Lang ....................... | B60R 11/04 348/148 |
| 2015/0195435 A1* | 7/2015 | Oshida ................. | H04N 5/2253 348/373 |
| 2016/0349502 A1* | 12/2016 | Irie .......................... | B60R 13/07 |

FOREIGN PATENT DOCUMENTS

JP    2013-520363    6/2013

* cited by examiner

*Primary Examiner* — Christopher M Raabe
(74) *Attorney, Agent, or Firm* — Amin, Turocy & Watson, LLP (57) ABSTRACT

An imaging unit for a vehicle including: an imaging device configured to image an area outside of a vehicle; and a housing attached to a side portion of a vehicle body of the vehicle and configured to accommodate the imaging device, wherein the housing comprises a convex section formed by downwardly swelling a lower wall that faces a lower side of the vehicle, and a drain hole formed in the convex section and configured to discharge water entered the housing to an outside of the housing.

7 Claims, 8 Drawing Sheets

IMAGING UNIT FOR VEHICLE

CROSS-REFERENCE TO RELATED APPLICATION

Priority is claimed on Japanese Patent Application No. 2019-101110, filed May 30, 2019, the content of which is incorporated herein by reference.

BACKGROUND OF THE INVENTION

Field of the Invention

The present invention relates to an imaging unit for a vehicle.

Description of Related Art

A structure in which an imaging unit (a camera) having an imaging device configured to image a rear side of a side portion of a vehicle and a monitor configured to display an image captured by the imaging device are integrated, and the integrated monitor unit is attached to a triangular window portion of a front section of a front side door is known (see Published Japanese Translation No. 2013-520363 of the PCT International Publication).

In a state in which the monitor unit disclosed in Published Japanese Translation No. 2013-520363 of the PCT International Publication is attached to a triangular window portion of the front side door, the monitor is disposed in a passenger compartment, and the imaging unit is disposed outside the passenger compartment. An imaging lens of the imaging unit is installed on a rear surface of a housing such that an optical axis faces a rear side of the side portion of the vehicle.

SUMMARY OF THE INVENTION

In the monitor unit disposed in Published Japanese Translation No. 2013-520363 of the PCT International Publication, the imaging device is accommodated in the housing of the imaging unit disposed on an outer side of the vehicle.

However, it is difficult to block a gap between a lens of the imaging unit and the housing so that water does not enter. For this reason, water may enter the housing during car washing, rain, or the like. When water accumulates in the housing, the water may spread from the gap of a part-aligning section or the like of the housing to a lens outer surface due to vibrations or the like during travel, and may degrade a field of vision of the lens.

An aspect of the present invention is directed to providing an imaging unit for a vehicle capable of making it difficult for water to adhere to a lens outer surface even when the water enters a housing.

(1) An imaging unit for a vehicle according to the present invention includes an imaging device configured to image an area outside of a vehicle; and a housing attached to a side portion of a vehicle body of the vehicle and configured to accommodate the imaging device, and the housing includes a convex section formed by downwardly swelling a lower wall that faces a lower side of the vehicle, and a drain hole formed in the convex section and configured to discharge water entered the housing to an outside of the housing.

According to the aspect of the above-mentioned (1), the water entered the housing from the gap or the like between the periphery of the lens of the imaging device (the camera) and the lens exposure hole of the housing (the cover) flows downward to the lower wall, and remains in the concave shape of the convex section inside the housing. The water is appropriately discharged to the outside of the housing through the drain hole. For this reason, discharge of the water entering the housing can be substantially completed when the vehicle is stopped. While the imaging lens is exposed at the outer surface of the housing, the following effects are provided by discharging the water in the housing when the vehicle is stopped. That is, the possibility of water drained from the drain hole adhering to the lens outer surface during travel of the vehicle and lowering visibility (so-called splash) can be reduced.

(2) In the aspect of the above-mentioned (1), the convex section may have a streamline shape in which a longitudinal direction is oriented in a vehicle forward/rearward direction.

According to the aspect of the above-mentioned (2), since the convex section has the streamline shape, an increase in air resistance due to the convex section provided in the lower wall of the housing can be minimized.

(3) In the aspect of the above-mentioned (1) or (2), the convex section may have a forward inclination section, a protrusion apex section and a rearward inclination section in sequence from a forward side of the vehicle and the drain hole may be provided in the protrusion apex section or the rearward inclination section.

According to the aspect of the above-mentioned (3), since the drain hole is formed in the protrusion apex section or the rearward inclination section of the convex section, drainage can be performed while an influence due to traveling air is minimized That is, when the drain hole is formed in the forward inclination section facing the front of the vehicle, the traveling air from the front of the vehicle blows into the drain hole, and drainage is obstructed. Such an influence is minimized by forming the drain hole in the protrusion apex section or the rearward inclination section. When the drain hole is formed in the protrusion apex section (the lowermost end portion of the convex section), the water in the convex section is easily discharged even when the vehicle is stopped. When the drain hole is formed in the rearward inclination section, a suction effect due to traveling air is easily obtained, and occurrence of wind noise is also minimized.

(4) In the aspect of the above-mentioned (3), in the convex section, the imaging lens of the imaging device may be disposed at a same position as the protrusion apex section in the vehicle forward/rearward direction, and the drain hole may be disposed in the rearward inclination section.

According to the aspect of the above-mentioned (4), in the convex section, the imaging lens and the drain hole can be efficiently distributed on front and rear sides. Since the drain hole is disposed behind the imaging lens, the water does not easily adhere to the imaging lens even when the water is drained from the drain hole.

(5) In the aspect of the above-mentioned (4), the drain hole may be formed at a center of the convex section in the vehicle width direction, and the imaging lens may be provided to deviate outward in the vehicle width direction with respect to the center of the convex section in the vehicle width direction.

According to the aspect of the above-mentioned (5), since the drain hole is formed at the center of the convex section in the vehicle width direction, drainage characteristics can be increased (drainage is easily performed) by making the drain hole closer to the lowermost end portion of the convex section. Since the imaging lens is provided to deviate outward in the vehicle width direction of the convex section, even when the air flow is disturbed due to irregularities around the imaging lens, an influence on the suction effect of the traveling air flowing around the drain hole is minimized.

(6) In the aspect of any one of the above-mentioned (1) to (5), a rear imaging lens of the imaging device may be disposed on a rear end portion of the housing, and the drain hole and the rear imaging lens may be offset from each other in the vehicle width direction.

According to the aspect of the above-mentioned (6), since the drain hole and the rear imaging lens are offset in the vehicle width direction, even when the water drained from the drain hole flows toward the housing rear end, the water does not easily adhere to the rear imaging lens.

(7) In the aspect of any one of the above-mentioned (1) to (6), the housing may include a second drain hole formed in a lower edge portion provided in the lowermost end portion of the housing.

According to the aspect of the above-mentioned (7), the water remaining in the housing without being discharged from the drain hole reaches the lower edge portion including the lowermost end portion of the housing when the vehicle is stopped or the like, and is discharged to the outside of the housing through the second drain hole. Accordingly, drainage characteristics of the housing can be increased.

According to the aspect of the present invention, it is possible to provide the imaging unit for a vehicle capable of making it difficult for water to adhere to the lens outer surface even when the water enters the housing.

DETAILED DESCRIPTION OF THE INVENTION

Hereinafter, an embodiment of the present invention will be described with reference to the accompanying drawings. Further, directions of forward, rearward, upward, downward, leftward and rightward, in the following description are the same as directions in a vehicle described below unless the context clearly indicates otherwise. In addition, in appropriate places in the drawings, an arrow UP indicates an upward direction with respect to the vehicle, an arrow FR indicates a forward direction with respect to the vehicle, and an arrow LH indicates a leftward direction with respect to the vehicle.

Figure 1:
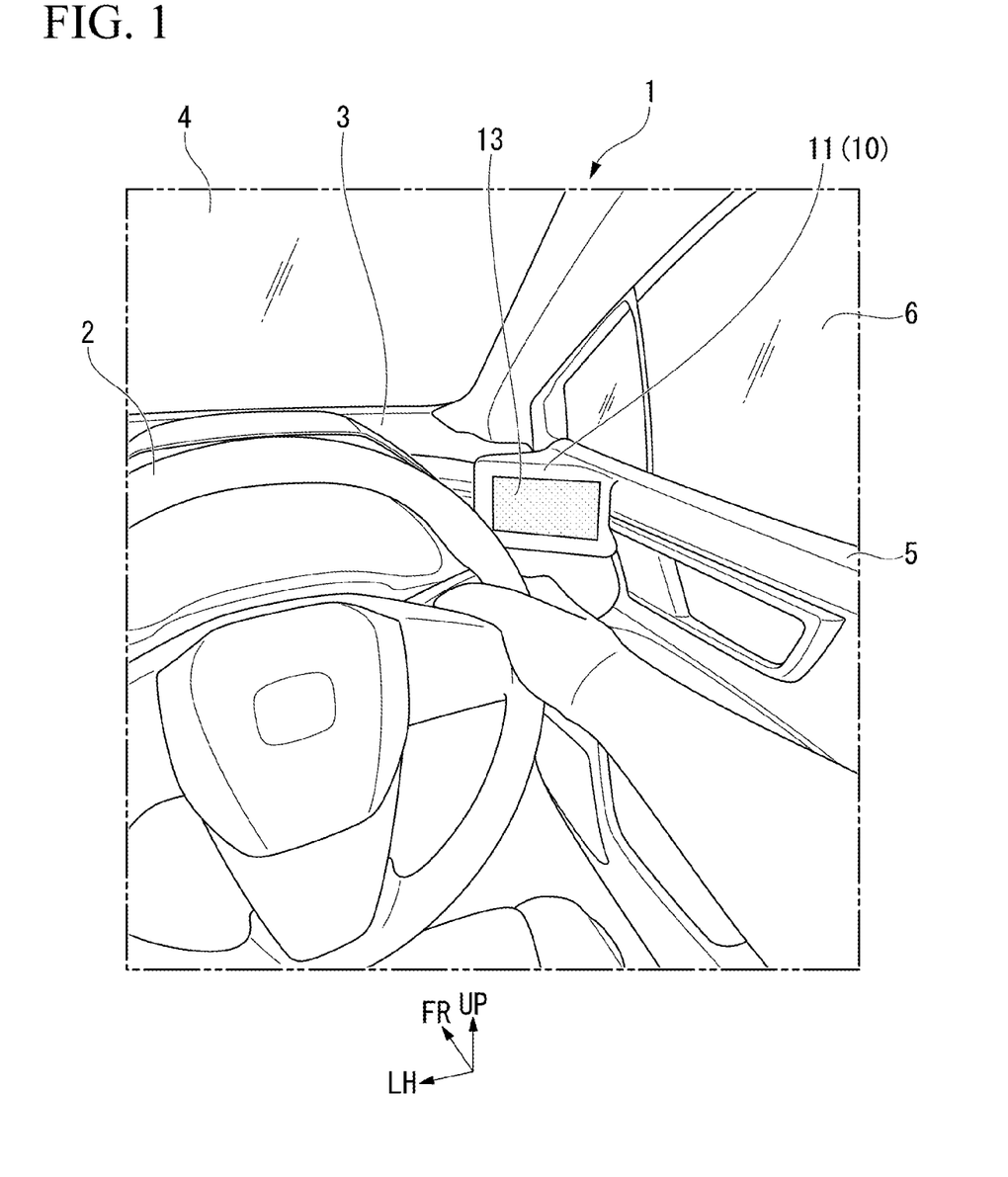
FIG. 1 is a perspective view showing an inner side of a passenger compartment of a vehicle of the embodiment of the present invention.

FIG. 1 is a view showing an inner side of a passenger compartment of a vehicle 1 of an embodiment. FIG. 1 is a view showing a forward side of front seats (a driver's seat and a passenger's seat) in the vehicle from obliquely above and to the rear.

Reference sign 2 in FIG. 1 indicates a steering wheel disposed in front of the driver's seat (not shown), reference sign 3 indicates an installment panel, reference sign 4 indicates a windshield glass in front of a passenger compartment, and reference sign 5 indicates a front side door (a side door) on the side of the driver's seat. In addition, reference sign 6 indicates a door glass provided in the front side door 5 configured to be elevated. The vehicle 1 of the embodiment is provided with rear display systems 10 configured to display rearward of side portions of the vehicle at inside the passenger compartment. The rear display systems 10 cause rearward imaging devices 15 (imaging devices, see FIG. 7 or the like) to image areas on the left and right rearward sides of the vehicle, and display the images on monitors 11 (display devices) in the passenger compartment.

The rear display systems 10 include the rearward imaging devices 15 disposed on outer sides of the left and right front side doors 5, the pair of monitors 11 corresponding to the left and right rearward imaging devices 15 and installed in the passenger compartment, and a control device (not shown) configured to control the rearward imaging devices 15 and the monitors 11. The monitors 11 corresponding to the left and right rearward imaging devices 15 are installed in the vicinity of lower ends of left and right front pillars 7 in the passenger compartment. An image on a left rearward side of the vehicle is displayed on the monitor 11 of the lower end of the front pillar 7 on the left side, and an image on a right rearward side of the vehicle is displayed on the monitor 11 of the lower end of the front pillar 7 on the right side.

Figure 2:
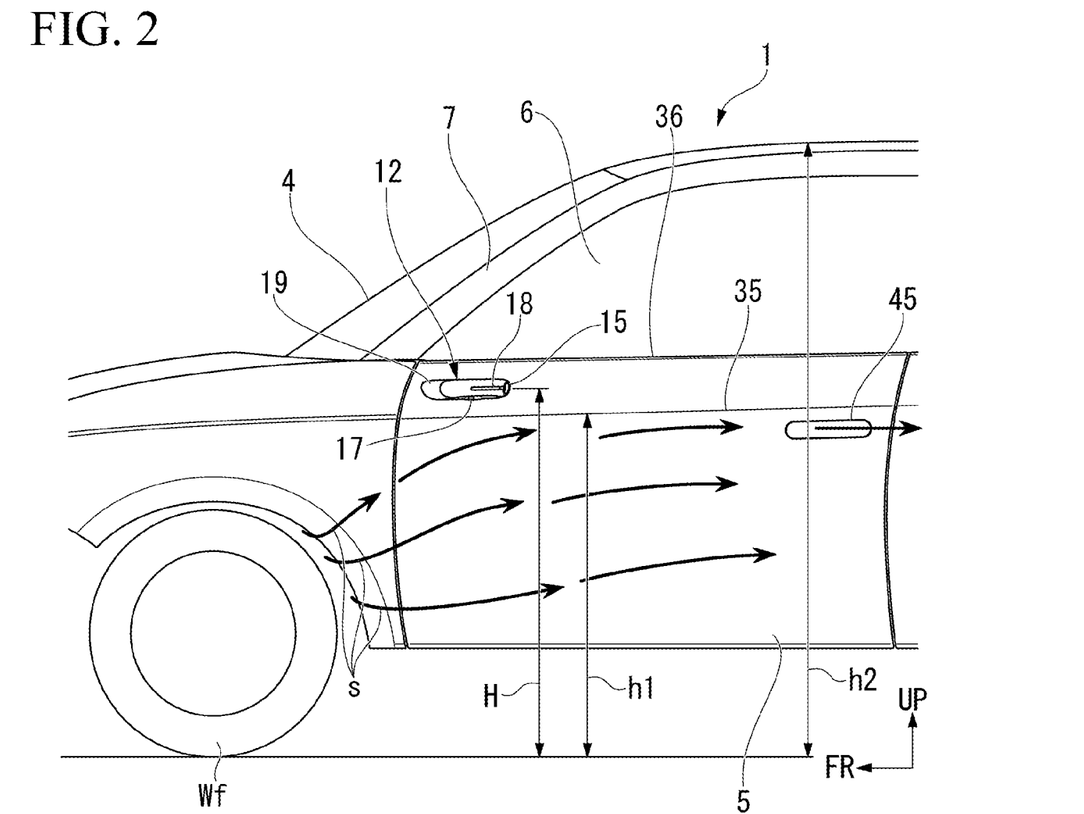
FIG. 2 is a side view of the vehicle of the embodiment of the present invention.
Figure 3:
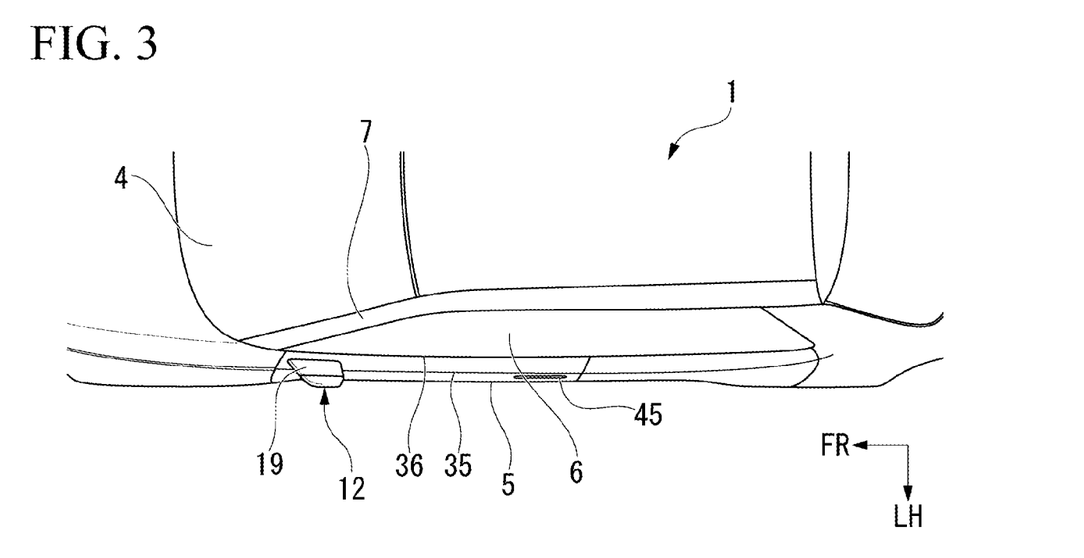
FIG. 3 is a plan view of the vehicle of the embodiment of the present invention.
Figure 4:
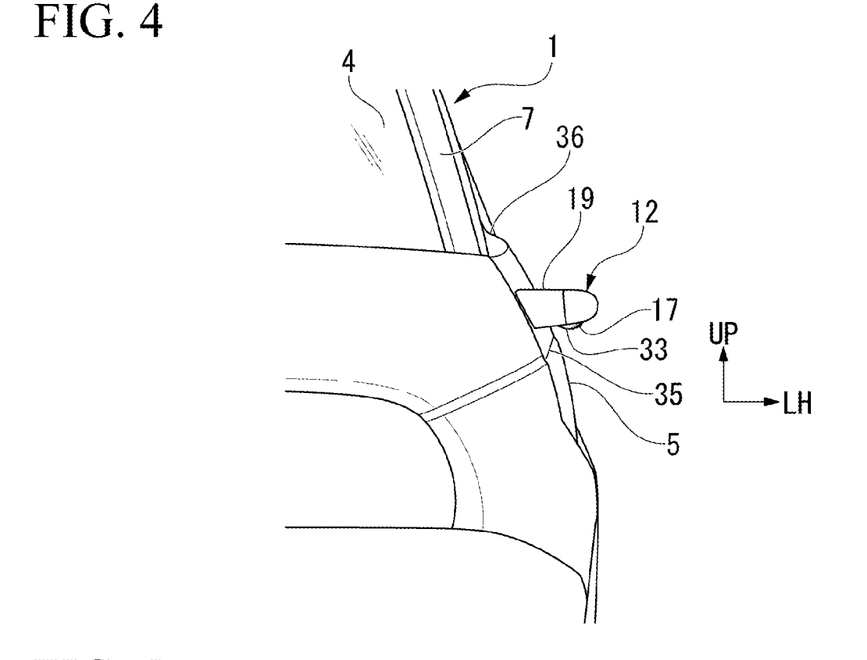
FIG. 4 is a front view of the vehicle of the embodiment of the present invention.
Figure 5:
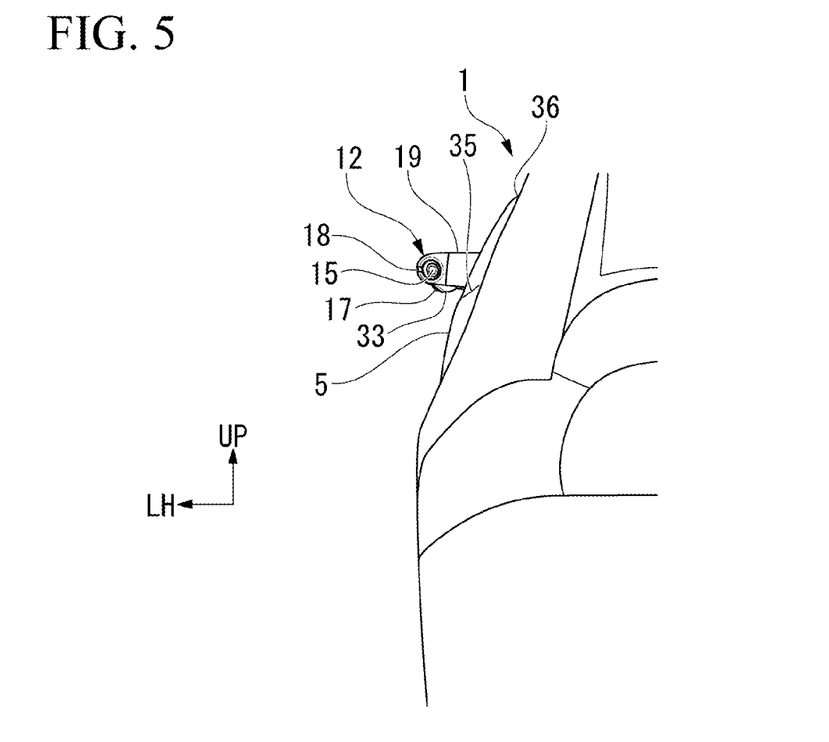
FIG. 5 is a rear view of the vehicle of the embodiment of the present invention.

FIG. 2 is a view showing the vehicle 1 from a leftward side, and FIG. 3 is a view showing a left half region of the vehicle 1 from above. In addition, FIG. 4 is a view showing the left half region of the vehicle 1 from the front, and FIG. 5 is a view showing the left half region of the vehicle from the rear.

As shown in the drawings, an imaging unit 12 for a vehicle (hereinafter referred to as "the imaging unit 12") in which the rearward imaging device 15 is installed is attached to an outer side surface of the front side door 5 on the left side. Further, an imaging unit 12 that is the same as that on the left side is also attached to an outer side surface of the front side door 5 on the right side.

Figure 6:
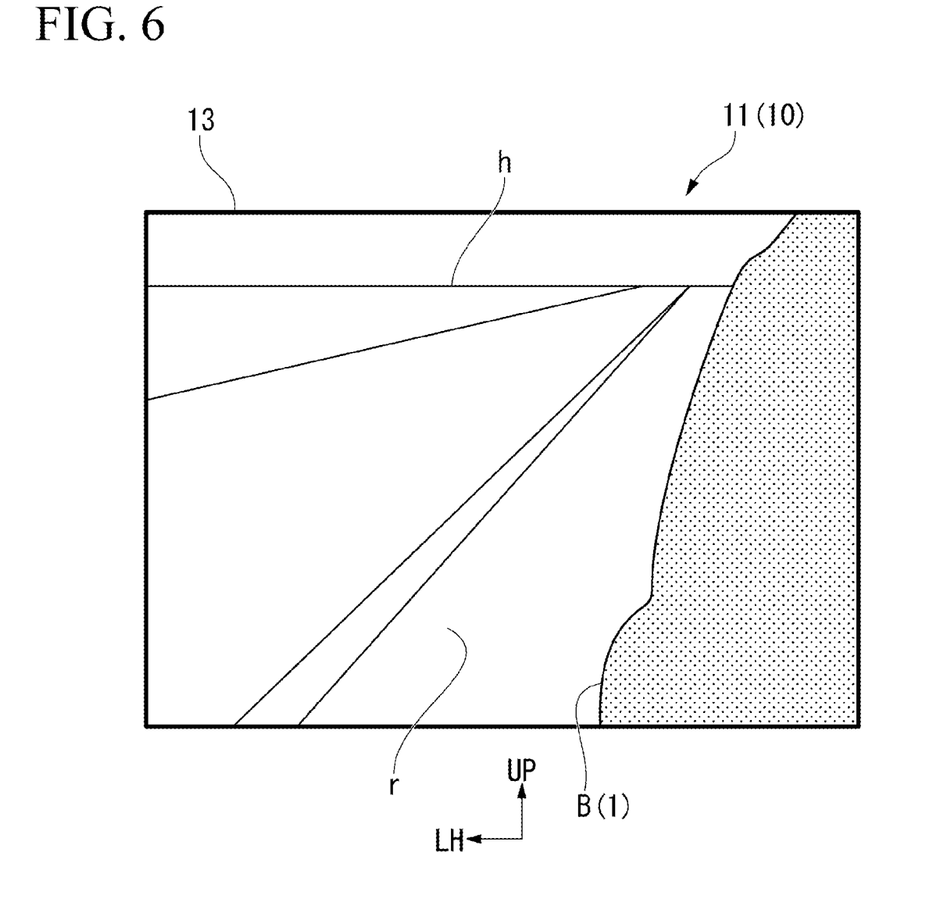
FIG. 6 is a view showing display of a monitor of a rear display system of the embodiment of the present invention.

FIG. 6 is a view showing a display screen 13 of the monitor 11 installed in the passenger compartment.

An image behind a side portion imaged by the rearward imaging device 15 is displayed together with a part of a vehicle body B of a side portion of an own vehicle on the display screen 13 of the monitor 11. When the vehicle 1 travels on a flat road surface, a horizontal line h behind the vehicle and a road surface r at a predetermined distance behind the vehicle are set to be simultaneously displayed on the display screen 13. An imaging object displayed on the display screen 13 is appropriately set according to a size of the display screen 13, an installation height and a position in a forward/rearward direction of the rearward imaging device 15, an angle of view, and the like. In addition, a display amount of the own vehicle on the display screen 13 is set to, for example, 10% or less of the entire display screen 13.

Figure 7:
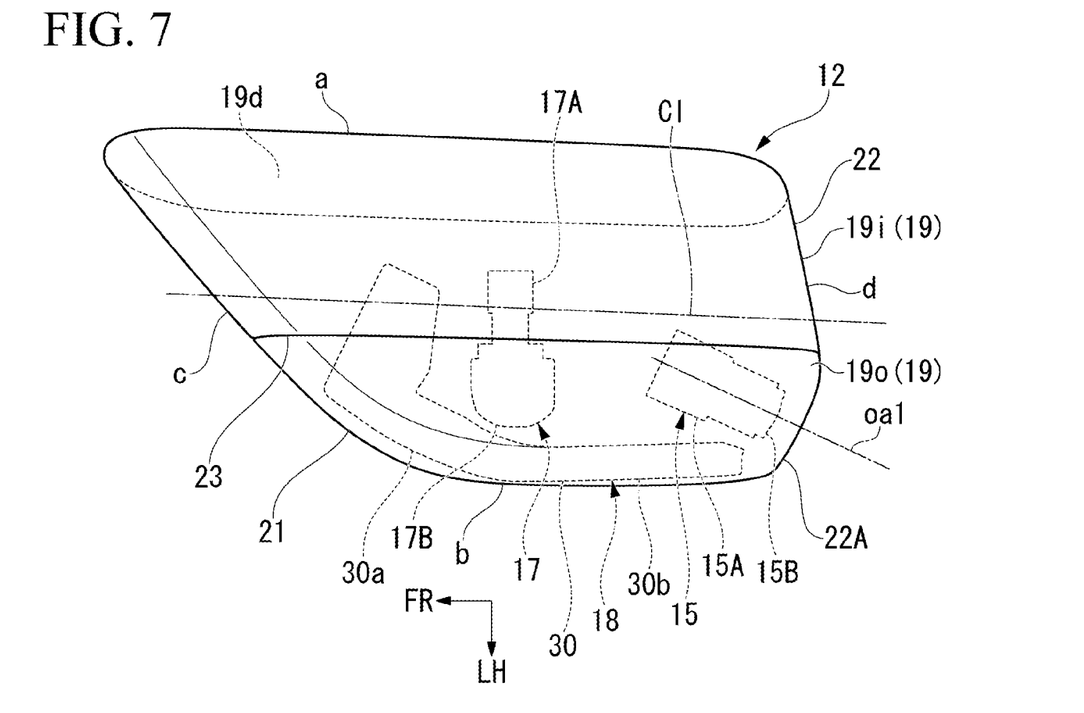
FIG. 7 is a plan view of an imaging unit of the embodiment of the present invention.
Figure 8:
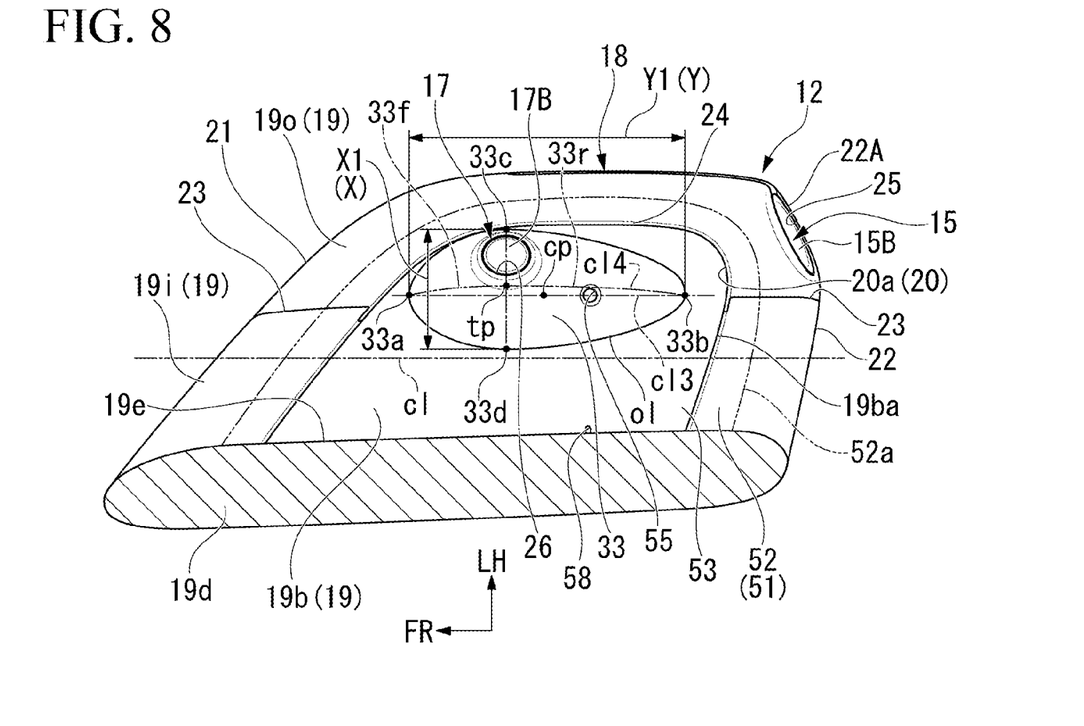
FIG. 8 is a bottom view of the imaging unit of the embodiment of the present invention.
Figure 9:
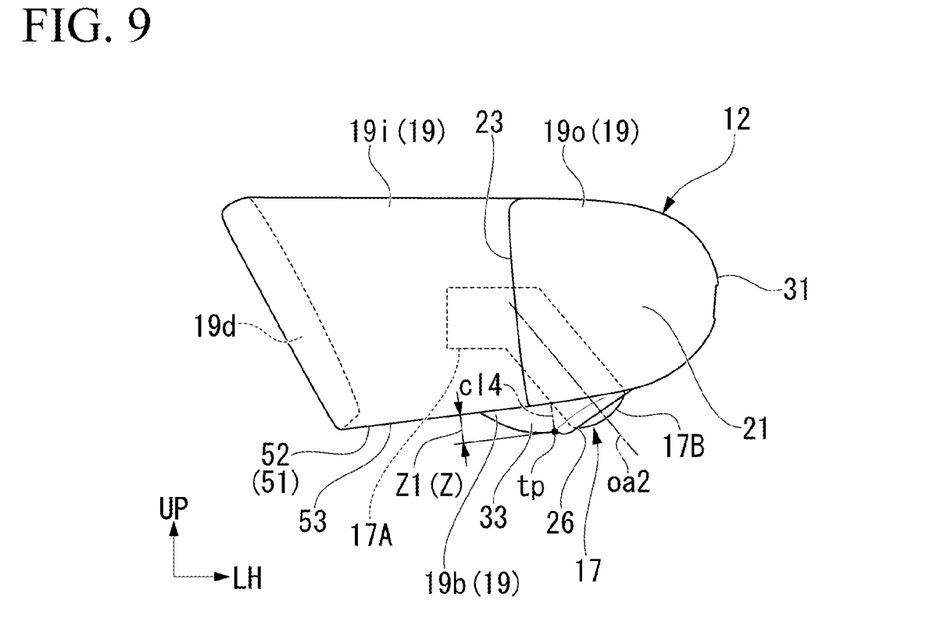
FIG. 9 is a front view of the imaging unit of the embodiment of the present invention.
Figure 10:
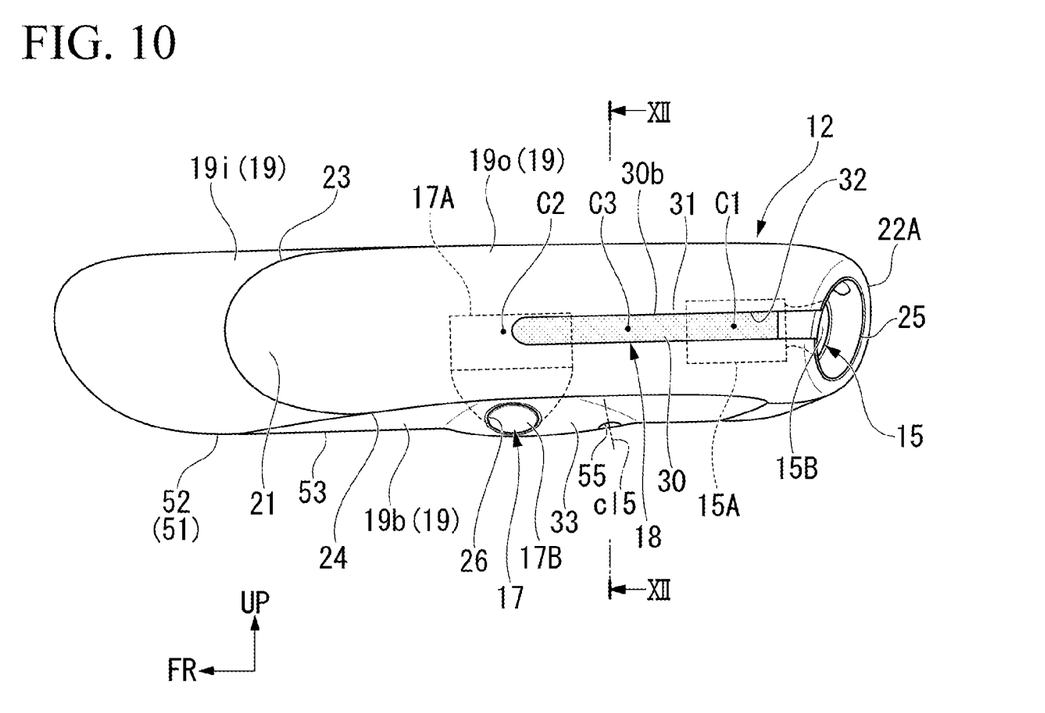
FIG. 10 is a side view of the imaging unit of the embodiment of the present invention.
Figure 11:
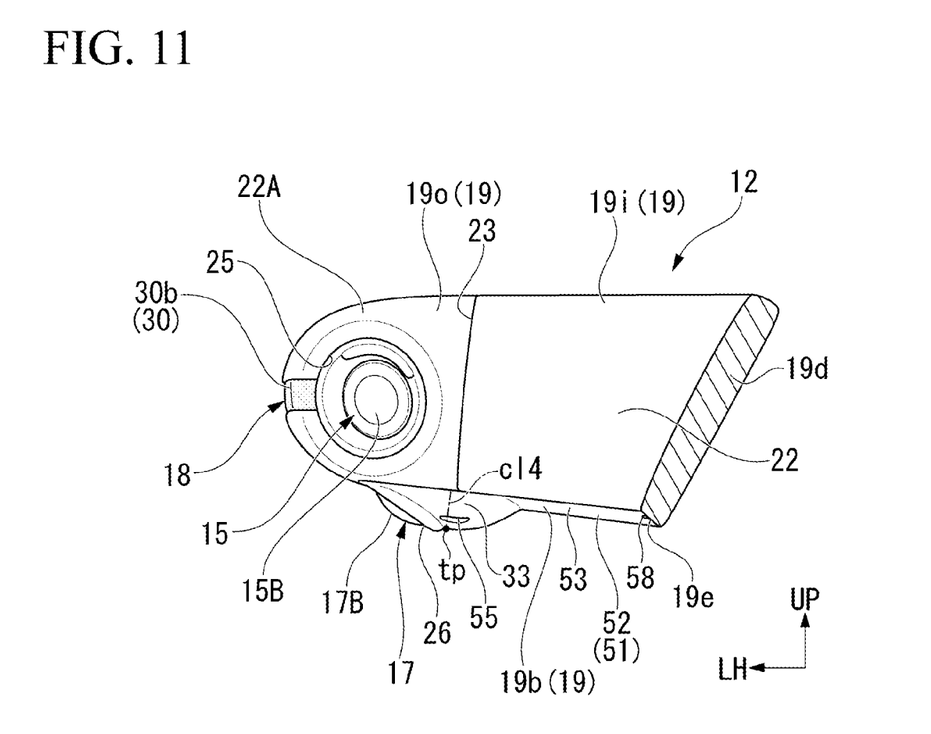
FIG. 11 is a rear view of the imaging unit of the embodiment of the present invention.

FIG. 7 is a plan view of the imaging unit 12 installed on the front side door 5 on the left side, and FIG. 8 is a bottom view of the above-mentioned imaging unit 12. FIG. 9, FIG. 10 and FIG. 11 are a front view, a side view and a rear view of the above-mentioned imaging unit 12, respectively.

As shown in the drawings, the imaging unit 12 includes the rearward imaging device 15 configured to image a rearward side of a side portion of the vehicle, a downward imaging device 17 (an imaging device) configured to image a downward side of a side portion of the vehicle, a lighting body unit 18 that constitutes a turn signal, a width indicator, or the like, and a housing 19 configured to accommodate them. The housing 19 is attached to an outer surface close to a front section of the front side door 5 via a base member (not shown).

The housing 19 includes an inner housing 19i attached to an outer surface of the front side door 5 (a side portion of the vehicle body), an outer housing 19o assembled to an outer side of the inner housing 19i in a vehicle width direction, and a bottom housing 19b assembled to an opening 20 formed in bottom sections of the inner housing 19i and the outer housing 19o. The inner housing 19i, the outer housing 19o and the bottom housing 19b are detachably assembled to each other by a screw clamp, a clip clamp, concavo-convex fitting, or the like. The inner housing 19i, the outer housing 19o and the bottom housing 19b are formed of, for example, a hard resin material.

As shown in FIG. 7, the housing 19 is formed in a substantially trapezoidal shape in which a width of an outer side b on an outward side in the vehicle width direction is smaller than that of an inner side a attached to the front side door 5 on an inward side in the vehicle width direction when seen in a plan view. A front end portion of the inner side a and a front end portion of the outer side b are connected by an inclined side c. The inclined side c is inclined outward from the front end portion of the inner side a toward a rearward side in the vehicle width direction. The inclined side c and the outer side b are connected to each other with a smooth curve. In an outer side surface of the housing 19, a portion corresponding to the inclined side c and a curved portion that connects the inclined side c and the outer side b is referred to as an inclined region 21 of the housing 19. In the outer side surface of the housing 19, a portion corresponding to a side d that connects rear end portions of the inner side a and the outer side b is referred to as a rear end region 22 of the housing 19.

As shown in FIG. 7, a split boundary section 23 between the inner housing 19i and the outer housing 19o is disposed on an upper surface side of the housing 19. The split boundary section 23 on the upper surface side of the housing 19 extends linearly substantially in the vehicle forward/rearward direction. The split boundary section 23 on the upper surface side of the housing 19 is disposed at a position deviated further outward in the vehicle width direction than a central position (a centerline c1 in FIG. 7) in the vehicle width direction of the housing. In addition, the outer surface of the housing 19 is set to different colors on inward and outward sides in the vehicle width direction with the split boundary section 23 sandwiched therebetween. However, the outer surface of the inner housing 19i and the outer surface of the outer housing 19o are constituted by surfaces that are smoothly continuous with the split boundary section 23 sandwiched therebetween.

In addition, the split boundary section 23 between the inner housing 19i and the outer housing 19o extends in front and rear end portions of the inner housing 19i and the outer housing 19o toward the lower surfaces to cross the end portions.

As shown in FIG. 8, the opening 20 is formed in the lower surface of the outer housing 19o to overhang outward from the split boundary section 23 in the vehicle width direction. A portion of the outer housing 19o overhanging outward from the opening 20 in the vehicle width direction is a split boundary section 24 between the bottom housing 19b and the outer housing 19o. The bottom housing 19b is detachably assembled to lower wall of the inner housing 19i and the outer housing 19o to cross the lower walls.

The rearward imaging device 15 includes a device main body 15A in which an image sensor or various processing circuits are installed, and an imaging lens 15B configured to capture an image of an imaging object. The rearward imaging device 15 is disposed closer to a portion in the housing 19 than an outer side of a rear section in the vehicle width direction. A portion of the imaging lens 15B close to an outer side of the rear end region 22 of the housing 19 in the vehicle width direction is exposed at the outside of the vehicle body. A rearward inclination surface 22A oriented to a rearward side of the side portion of the vehicle is provided in a portion of the housing 19 (the outer housing 19o) close to an outer side of the rear end region 22 in the vehicle width direction. A first lens exposure hole 25 (a lens arrangement section) configured to expose the imaging lens 15B at the outside of the vehicle body is provided in the rearward inclination surface 22A. As shown in FIG. 7, an optical axis oa1 of the imaging lens 15B is directed toward the rearward side of the vehicle while being slightly inclined outward in the vehicle width direction.

In addition, the downward imaging device 17 is used in a blind monitor system or the like configured to display a downward side of the side portion that is a blind spot from a driver's seat on a monitor (not shown) on the side of the driver's seat. The downward imaging device 17 includes a device main body 17A in which an image sensor or various processing circuits are installed, and an imaging lens 17B configured to capture an image of an imaging object. The imaging lens 17B is exposed in a lower surface of a central region of the housing 19 in the vehicle forward/rearward direction at the outside of the vehicle body. A second lens exposure hole 26 configured to expose the imaging lens 17B at the outside of the vehicle body is formed in the lower surface of the bottom housing 19b. As shown in FIG. 9, an optical axis oa2 of the imaging lens 17B is directed toward a lower side of the vehicle while being slightly inclined outward in the vehicle width direction.

As shown in FIG. 7, the rearward imaging device 15 is disposed on a further rearward side of the vehicle than the downward imaging device 17 when the housing 19 is seen from above. In addition, an outer end of the imaging lens 15B in the vehicle width direction is disposed in the housing 19 to be located further outward in the vehicle width direction than the downward imaging device 17.

As shown in FIG. 10, in a state in which the housing 19 is attached to a side portion of the front side door 5, they are disposed as follows. The rearward imaging devices 15 and the downward imaging device 17 are disposed inside the housing 19 such that positions of the centers c1 and c2 of the device main bodies 15A and 17A are substantially horizontal.

As shown in FIG. 7, the lighting body unit 18 includes an elongated light guide body 30 configured to guide light from a lighting body such as an LED or the like to a predetermined area of an outer surface of the housing 19. The light guide body 30 has an inclination section 30a extending to be inclined outward in the vehicle width direction from the front section of the housing 19 toward a rear side of the vehicle body, and a light radiation part 30b extending linearly from a rear end portion of the inclination section 30a toward a rear side of the vehicle.

A side surface of the housing 19 on an outward side in the vehicle width direction is formed by an arc-shaped surface curved in the upward/downward direction. A groove 32 (a notch) having a substantially rectangular cross section is formed substantially in a vehicle body forward/rearward direction at a position in the side surface on an outer side in the vehicle width direction slightly below a maximum swelling section 31 on an outer side in the vehicle width direction. The light radiation part 30b in the light guide body 30 of the lighting body unit 18 is disposed in the groove 32 of the housing 19. Further, the rear end portion of the light radiation part 30b of the light guide body 30 is disposed in front of the position in the groove 32 of the housing 19 facing the rearward inclination surface 22A. That is, the light radiation part 30b is not disposed in the vicinity of the rear end portion of the groove 32 of the housing 19. Accordingly, light emitted from the light radiation part 30b is prevented from entering the imaging lens 15B of the rearward imaging device 15.

Further, the rear end portion of the groove 32 of the housing 19 may be closed by a member having no optical transparency.

The inclination section 30a in the light guide body 30 of the lighting body unit 18 is disposed in the housing 19 together with parts such as a lighting body or the like. The inclination section 30a of the light guide body 30 is disposed substantially along the inclined region 21 of the outer side surface of the housing 19. The downward imaging device 17 is disposed on an inner portion in the vehicle width direction of the inclination section 30a of the light guide body 30 in the housing 19. The imaging lens 17B of the downward imaging device 17 is inclined obliquely downward from the device main body 17A toward an outward side in the vehicle width direction. A portion of the imaging lens 17B inclined obliquely downward is disposed on an inner portion of the inclination section 30a of the light guide body 30 in the vehicle width direction.

As shown in FIG. 10, the lighting body unit 18 is disposed as follows in a state in which the housing 19 is attached to the side portion of the front side door 5. The lighting body unit 18 is disposed in the housing 19 such that a center c3 in the upward/downward direction is substantially horizontal with respect to the positions of the centers c1 and c2 of the device main bodies 15A and 17A of the rearward imaging device 15 and the downward imaging device 17.

A convex section 33 swelling downward is provided in an outer region of the bottom housing 19b in the vehicle width direction. The convex section 33 is formed in a long spindle shape in the vehicle forward/rearward direction. The second lens exposure hole 26 configured to expose the imaging lens 17B of the downward imaging device 17 below the bottom housing 19b is formed in the convex section 33. The second lens exposure hole 26 is disposed in a region in the convex section 33 wider than a width of the second lens exposure hole 26 in the vehicle width direction, for example, a region two or more times the width of the second lens exposure hole 26 in the vehicle width direction. The convex section 33 has a region extending to a further rearward side of the vehicle than the second lens exposure hole 26 (the imaging lens 17B).

As shown in FIG. 2, the imaging unit 12 is disposed at a height, which will be described below, in the side portion of the vehicle 1.

Further, in FIG. 2, reference sign 35 indicates a character line of the side portion of the vehicle body, and reference sign 36 indicates a door waist section. The character line 35 is a convex ridge section provided to rise on an outer surface of the side portion of the vehicle body including the front side door 5, and extends substantially in the vehicle forward/rearward direction. In addition, the door waist section 36 is a portion of an upper side of the door main body of the front side door 5, and constitutes a lower side in appearance of the window frame section in which a door glass 6 is elevated.

The imaging unit 12 is disposed above a height h1 of the character line 35 of the front side door 5 within a height range from 925 mm or more from a ground surface to a maximum vehicle height h2 or less. For this reason, as shown in FIG. 2, splash s flipped up by a front wheel Wf of the own vehicle during travel of the vehicle is blocked by a rising portion of the character line 35 and does not easily adhere to the imaging unit 12.

In the case of the embodiment, since an installation height of the imaging unit 12 is set to 925 mm or more from the ground surface, halation due to light of a headlight of a following vehicle is unlikely to occur. That is, in the embodiment, the imaging unit 12 is disposed at a height of 950 mm, which is a maximum installation height of a headlight of a general vehicle used on public roads, and a height of 925 mm or more in consideration of a downward inclination of an optical axis of the headlight. For this reason, light of the headlight of a following vehicle is prevented from directly entering the rearward imaging device 15 and causing halation. A dimension H in the drawing indicates an installation height (a ground height) of the optical axis oa1 of the imaging lens 15B of the rearward imaging device 15, and the dimension H is 925 mm or more.

In addition, in the case of the embodiment, the imaging unit 12 is disposed at a position of the front side door 5 below the door waist section 36. For this reason, the imaging unit 12 is less likely to enter a field of vision of a driver through the window frame section of the front side door 5.

In addition, as shown in FIG. 2, a retractable flash door handle 45 is provided on a rear edge portion of the outer surface of the front side door 5. The flash door handle 45 is formed in a rectangular shape that is horizontally long when seen in a side view of the vehicle. The imaging unit 12 attached to the front edge portion of the outer surface of the front side door 5 is formed in substantially the same size and the same horizontally long rectangular shape as the flash door handle 45 when seen in a side view of the vehicle. The imaging unit 12 and the flash door handle 45 are disposed at point-symmetric positions with a point on the character line 35 as a center when seen in a side view of the vehicle.

Next, major parts of the embodiment will be described.

Referring to FIG. 8 to FIG. 11, the convex section 33 swelling downward is formed in a lower surface 51 of the housing 19 of the imaging unit 12. The convex section 33 is formed by swelling a plate-shaped lower wall 52 that forms the lower surface 51 of the housing 19 in a downward convex hemispherical shape. The convex section 33 is formed in a teardrop type or a spindle type when seen in a bottom view. The convex section 33 is separated farther from the inner circumferential side than an outer circumferential edge 52a of the lower wall 52 of the housing 19 throughout the entire circumference when seen in a bottom view. The convex section 33 is disposed farther from the inner circumferential side than the outer circumferential edge 52a of the lower wall 52 and formed in a region in a surface direction along the lower surface 51 beyond a prescribed width.

An inner circumferential edge of the lower wall 52 on an inward side in the vehicle width direction reaches an inner end of the housing 19 on the inward side in the vehicle width direction. An outer edge of the lower wall 52 in the vehicle width direction is disposed on a lower surface of the outer housing 19o. Front and rear edges of the lower wall 52 on the front and rear sides of the vehicle are in a range that crosses the lower surface of the outer housing 19o and the lower surface of the inner housing 19i. The outer edge, the front edge and the rear edge of the lower wall 52 are shown by two-dot chain lines in the drawings as the outer circumferential edge 52a. The outer edge, the front edge and the rear edge of the lower wall 52 extend substantially linearly. Front and rear end portions of the outer edge of the lower wall 52 and outer end portions of the front and rear edges are smoothly continuous via arcs.

In the lower wall 52 of the housing 19, an area except for the convex section 33 (hereinafter referred to as a general region 53) is formed in a substantially planar shape. The general region 53 is disposed in the vehicle forward/rearward direction (substantially horizontally, specifically, slightly inclined rearward and upward) while attached to the vehicle. The general region 53 is disposed obliquely to be disposed upward in the vehicle width direction as it goes outward in the vehicle width direction while attached to the vehicle.

The convex section 33 protrudes downward from the general region 53 of the lower wall 52. The convex section 33 is formed to have an external form extending to cross a pair of end portions 33a and 33b (the front end portion 33a disposed on the foremost end portion and the rear end portion 33b disposed on the rearmost end portion of the convex section 33) when seen in a bottom view. The convex section 33 is disposed such that a protrusion longitudinal direction crossing the front and rear end portions 33a and 33b is in the vehicle forward/rearward direction when seen in a bottom view. The convex section 33 is disposed such that a protrusion width direction perpendicular to the protrusion longitudinal direction is in the vehicle leftward/rightward direction (the vehicle width direction) when seen in a bottom view. The protrusion width direction is inclined with respect to the vehicle width direction in a state attached to the vehicle so that the protrusion width direction is set along the general region 53 of the lower wall 52.

A pair of end portions (left and right end portions 33c and 33d) disposed on the outermost side of the convex section 33 in the protrusion width direction are disposed in front of a central section cp in the protrusion longitudinal direction when seen in a bottom view of the convex section 33. In the convex section 33, a dimension (the entire length) Y1 in a protrusion longitudinal direction (a dimension arrow Y direction) is larger than either of a dimension (the entire width) X1 in a protrusion width direction (a dimension arrow X direction) and a dimension (the entire height) Z1 in a protrusion height direction (a dimension arrow Z direction) perpendicular to both of X and Y directions. In the convex section 33, the dimension (the entire height) Z1 in the protrusion height direction has a flat shape that is smaller than either of the dimension (the entire length) Y1 in the protrusion longitudinal direction and the dimension (the entire width) X1 in the protrusion width direction. When the convex section 33 is seen in the protrusion height direction, the convex section 33 has a line symmetrical external form with respect to the centerline c13 in the protrusion longitudinal direction (the centerline c13 that is a central position in the protrusion width direction). A line c14 in the drawing indicates a line of intersection between a virtual plane passing through the centerline c13 and perpendicular to the protrusion width direction and an outer surface of the convex section 33. The line of intersection c14 is also a form centerline c14 (a bisector) of the convex section 33.

The convex section 33 has a protrusion apex section tp that forms a position of the entire height in the protrusion height direction. A forward inclination section 33f having a protrusion height that gradually increases from the front end portion 33a of the convex section 33 toward the protrusion apex section tp is formed in front of the convex section 33 in the vehicle forward/rearward direction. A rearward inclination section 33r having a protrusion height that gradually increases from the protrusion apex section tp toward the rear end portion 33b of the convex section 33 is formed behind the convex section 33 in the vehicle forward/rearward direction. The rearward inclination section 33r is formed to be longer in the protrusion longitudinal direction than the forward inclination section 33f. The rearward inclination section 33r has a gentler inclination in the protrusion longitudinal direction than the forward inclination section 33f. The outer surface of the convex section 33 is formed in a smooth convex shape as a whole. The outer surface of the convex section 33 is formed in a concave shape only in an area along an outer circumferential edge o1 of the convex section 33, and smoothly continuous with the lower surface 51 of the lower wall 52.

An external form of the convex section 33 may be a streamline shape, in addition to a teardrop type and a spindle type. Accordingly, an increase in air resistance is minimized by providing the convex section 33. The convex section 33 functions as a vortex flow generator configured to generate a prescribed turbulent flow (a vortex flow) in traveling air that flows along the outer surface of the housing 19. Since a small turbulent flow is intentionally generated by the convex section 33, effects of minimizing separation of traveling air, reducing air resistance, and the like, can be obtained by controlling the air flow behind the housing 19.

The convex section 33 disposes the imaging lens 17B configured to image a downward side in an area located at the same position as the protrusion apex section tp in the vehicle forward/rearward direction. The imaging lens 17B has the center axis (the optical axis oa2) that is inclined outward in the vehicle width direction. The optical axis oa2 is inclined to be disposed outward in the vehicle width direction as it goes downward in the vertical direction. The imaging lens 17B is disposed further outward in the vehicle width direction than the centerline c13 (and the form centerline c14) of the convex section 33.

A drain hole 55 configured to discharge water entering the housing 19 is formed in the rear section (the rearward inclination section 33r) of the convex section 33. The drain hole 55 forms inner and outer openings 55a and 55b having true circle shapes on an inner surface side (an upper surface side, an inner side of the housing) and an outer surface side of the convex section 33. The drain hole 55 forms an inner circumferential surface 55c having a tapered shape that widens toward the outer surface side of the convex section 33. The drain hole 55 is larger in the outer opening 55b on the outer surface than the inner opening 55a on the inner surface of the convex section 33. The drain hole 55 forms an internal space having a truncated conical shape. The drain hole 55 has a center axis c15 that is inclined to be disposed rearward as it goes downward in the vertical direction. The drain hole 55 is disposed such that at least a part thereof overlaps the centerline c13 of the convex section 33 when seen in a bottom view. The drain hole 55 is disposed to deviate inward in the vehicle width direction with respect to the form centerline c14 of the convex section 33. The drain hole 55 is disposed to be located in a lower end of the convex section 33 at a position that is a rear section of the convex section 33 in the vehicle forward/rearward direction.

The drain hole 55 is not limited to a configuration provided in the rear section of the convex section 33 in the vehicle forward/rearward direction (an area behind the protrusion apex section tp), and may be provided in an area that is the same position as the protrusion apex section tp in the vehicle forward/rearward direction. In this case, the drain hole 55 is disposed in the lowermost end portion of the convex section 33. Since the convex section 33 extends in the vehicle forward/rearward direction, a degree of freedom in disposition of the drain hole 55 in the vehicle forward/rearward direction is increased, and the drain hole is easily disposed separately from the imaging lens 17B.

Figure 12:
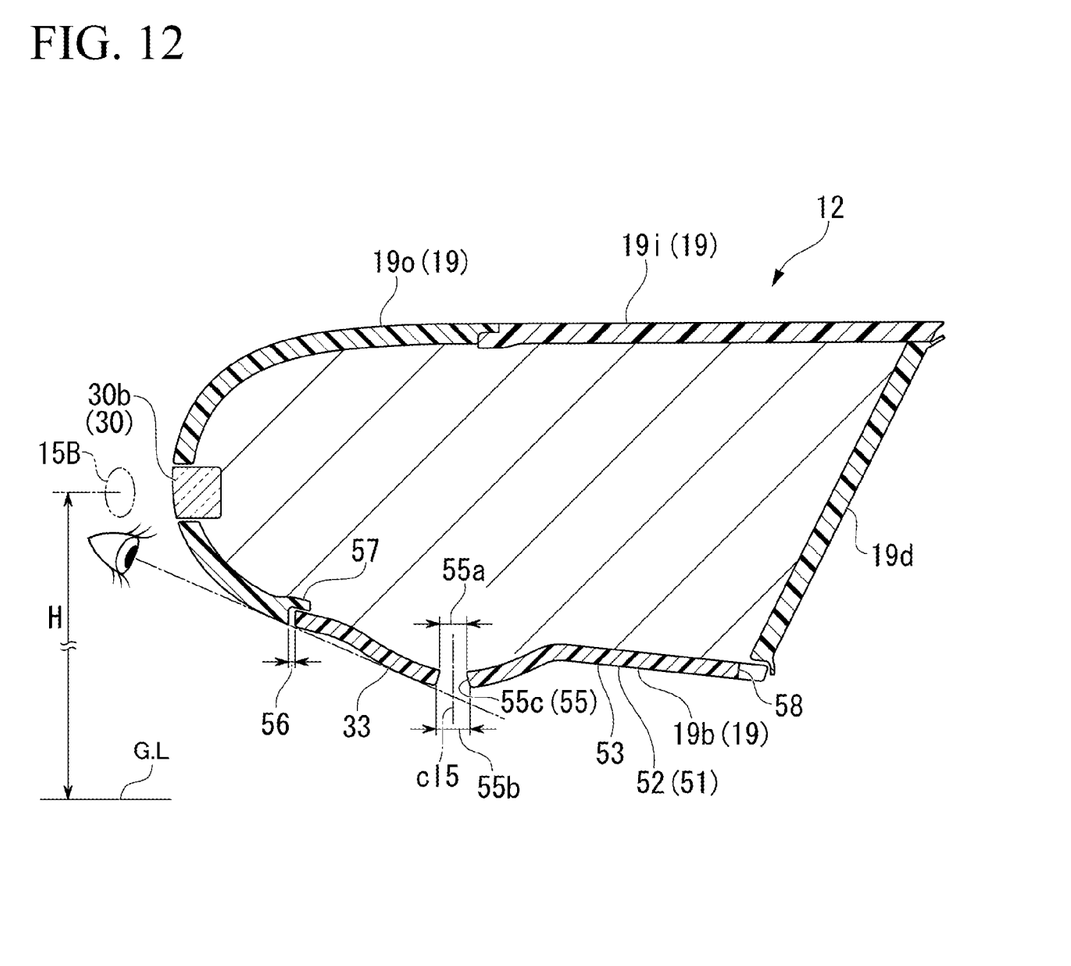
FIG. 12 is a cross-sectional view along line XII-XII in FIG. 10.

Referring to FIG. 8 and FIG. 12, a gap 56 (a groove) having a prescribed width is formed in a direction along the lower surface 51 of the housing between three outer circumferential edges 19ba in front of and behind the bottom housing 19b and an outward side in the vehicle width direction (hereinafter, simply referred to as the outer circumferential edges 19ba of the bottom housing 19b) and three inner circumferential edges 20a of the opening 20 of the housing. A stepped wall 57 that overlaps the outer circumferential edges 19ba of the bottom housing 19b from an inner side of the housing 19 is formed on the inner circumferential edge 20a of the opening 20 of the housing. Accordingly, water flowing along the outer surface of the housing 19 can be appropriately guided using the gap 56 as a water channel while suppressing the water to enter the housing 19 through the gap 56.

The gap 56 and the stepped wall 57 are provided on the rear edge portion behind at least the convex section 33 among the outer circumferential edges 19ba of the bottom housing 19b. Accordingly, a flow of the water drained from the drain hole 55 of the convex section 33 is blocked by the gap 56, the flow is hard to reach the imaging lens 15B of the rear end of the housing 19, and adherence of water to the imaging lens 15B is reduced.

A lower edge portion 19e of a vehicle body attachment surface section 19d of the housing 19 on an inward side in the vehicle width direction includes the lowermost end portion of the housing 19 at a state attached to the vehicle. An inner circumferential edge portion of the lower wall 52 of the housing 19 faces the lower edge portion 19e of the vehicle body attachment surface section 19d. A second drain hole 58 is formed in the inner circumferential edge portion. The second drain hole 58 is formed in, for example, an inner circumferential edge portion having a linear shape extending in the vehicle forward/rearward direction by a partially formed notch. The second drain hole 58 is formed by, for example, partially cutting out the inner circumferential edge portion of the bottom housing 19b. The second drain hole 58 has an opening area smaller than that of the drain hole 55 formed in the convex section 33.

Next, actions of the embodiment will be described.

Running water or rain water may enter the housing 19 through a gap in a parts-aligning section around the imaging lenses 15B and 17B (for example, a gap between the first lens exposure hole 25 of the rear end of the housing 19 and the imaging lens 15B) during car washing or traveling in rainy weather.

The water travels along the inner surface of the housing 19 and are collected in a concave shape on the upper surface side of the convex section 33 formed by swelling the lower wall 52 of the housing downward. The water remaining in the convex section 33 is discharged to the outside of the housing 19 from the drain hole 55 formed in the convex section 33.

In the housing 19, since the convex section 33 and the imaging lens 17B are adjacent to each other, the drain hole 55 is formed in the convex section 33 to complete drainage promptly. Accordingly, possibility of generating so-called splash (a phenomenon in which water scatters on the lens outer surface and becomes difficult to see) to the imaging lens 17B during traveling may be decreased.

The convex section 33 has a streamline shape having a longitudinal direction that is oriented in the vehicle forward/rearward direction, and the drain hole 55 configured to extract water in the convex section 33 (in the housing 19) is provided in the rearward inclination section 33r that decreases a protrusion height as it goes rearward in the convex section 33 on a rear side of the vehicle. Since the convex section 33 is formed in a streamline shape, a degree of freedom in disposition of the drain hole 55 in the vehicle forward/rearward direction is increased while an air resistance is reduced. Since the drain hole 55 is disposed behind the protrusion apex section tp of the convex section 33, traveling air does not directly hit the drain hole 55, drainage characteristics (easy drainage) are secured, and occurrence of wind noise is minimized Since a flow velocity of traveling air is increased behind the protrusion apex section tp to decrease a pressure during traveling of the vehicle, a suction effect due to traveling air is obtained and drainage characteristics from the drain hole 55 are further increased.

The imaging lens 17B is disposed at the same position as the lower end portion of the convex section 33 in the vehicle forward/rearward direction, and the drain hole 55 is disposed behind the imaging lens 17B. For this reason, the water discharged from the drain hole 55 is hard to adhere to the imaging lens 17B. In addition, since positions of the imaging lens 17B and the drain hole 55 are deviated from each other in the vehicle forward/rearward direction, an arrangement space of the imaging lens 17B and the drain hole 55 is easily secured.

The imaging lens 17B is disposed to be deviated outward in the vehicle width direction with respect to a center of the convex section 33 in the vehicle width direction, and the drain hole 55 is disposed at the center of the convex section 33 in the vehicle width direction center. Also in this respect, an arrangement space of the imaging lens 17B and the drain hole 55 is easily secured. In addition, even when a flow of the traveling air is disturbed due to irregularities around the imaging lens 17B, the influence on the air flow around the drain hole 55 is minimized. For this reason, a suction effect of water from the drain hole 55 due to the traveling air is easily obtained. Since the drain hole 55 is disposed at the center of the convex section 33 in the vehicle width direction, the drain hole 55 approaches the lower end portion of the convex section 33 as much as possible, and enhances drainage characteristics in the convex section 33.

The imaging lens 17B is disposed to be deviated outward in the vehicle width direction with respect to the protrusion apex section tp of the convex section 33 (the lower end portion, corresponding to the lowermost end portion of the convex section 33). For this reason, the drain hole 55 can also be disposed in the protrusion apex section tp of the convex section 33. Since the drain hole 55 is disposed in the protrusion apex section tp of the convex section 33, drainage characteristics in the convex section 33 are increased. Even though the drain hole 55 is disposed in either the rear section or the lower end portion of the convex section 33, when a periphery of the housing 19 is seem from a point of view (for example, a lens optical axis height H) overlooking the housing 19, the drain hole 55 is hidden by the convex section 33 not to be visible, and influence on the appearance is minimized Since the imaging lens 17B is disposed to be deviated outward from the convex section 33 in the vehicle width direction, the imaging range of the imaging lens 17B is easily widened outward in the vehicle width direction.

The water that did not accumulate in the convex section 33 due to vibrations, an inclination, or the like, of the vehicle appropriately flows through the housing 19, and then, are collected in the housing 19 on the side of the lowermost end portion on an inward side in the vehicle width direction during stopping or the like of the vehicle. The water collected in the housing 19 on the side of the lowermost end portion is discharged to the outside of the housing 19 from the second drain hole 58. Since the second drain hole 58 is located behind the imaging lens 17B and is also separated inside in the vehicle width direction, water drained from the second drain hole 58 cannot easily adhere to the imaging lens 17B. Since the second drain hole 58 is also separated from the imaging lens 15B of the rear end of the housing 19 on the inward side in the vehicle width direction, adhesion of water to the imaging lens 15B is also minimized.

Since the second drain hole 58 is formed in the inner circumferential edge portion of the lower wall 52 of the housing 19, water drained from the second drain hole 58 flows through the corner section formed by the lower wall 52 of the housing 19 and the outer side portion of the vehicle body. Also in this respect, adhesion of water to the imaging lenses 15B and 17B is minimized. The water entering the housing 19 is mainly discharged from the drain hole 55, and a small amount of water remaining in the housing 19 is discharged from the second drain hole 58 upon stopping or the like of the vehicle. For this reason, the second drain hole 58 requires a smaller opening area than the drain hole 55, and minimizes an influence on strength and rigidity in the inner circumferential edge portion of the lower wall 52.

As described above, the imaging unit 12 for a vehicle according to the embodiment includes the rearward imaging device 15 and the downward imaging device 17 configured to image surroundings of the vehicle, and the housing 19 configured to accommodate the rearward imaging device 15 and the downward imaging device 17 and attached to the side portion of the vehicle body, and the housing 19 includes the convex section 33 formed by downwardly swelling the lower wall 52 that faces the lower side of the vehicle, and the drain hole 55 formed in the convex section 33 and configured to discharge water entered the housing 19 to the outside of the housing 19.

According to the configuration, the water entered the housing 19 from the gap or the like between the imaging lenses 15B and 17B of the imaging devices 15 and 17 (the cameras) and the lens exposure holes 25 and 26 of the housing 19 (the cover) flows downward to the lower wall 52, and is remained in the concave shape of the convex section 33 inside the housing 19. The water is appropriately drained out of the housing 19 through the drain hole 55. For this reason, discharge of the water entering the housing 19 can be substantially completed when the vehicle stops. While the imaging lenses 15B and 17B are exposed to the outer surface of the housing 19, the following effects are obtained by discharging the water in the housing 19 when the vehicle stops. That is, the possibility that the water drained from the drain hole 55 adheres to the lens outer surface during traveling of the vehicle and so-called splash that becomes invisible is generated can be reduced.

In addition, in the imaging unit 12 for a vehicle, the convex section 33 has a streamline shape in which the longitudinal direction is oriented in the vehicle forward/rearward direction.

According to the configuration, since the convex section 33 has the streamline shape, an increase in air resistance due to the convex section 33 formed in the lower wall 52 of the housing 19 can be minimized.

In addition, in the imaging unit 12 for a vehicle, the convex section 33 has the forward inclination section 33f, the protrusion apex section tp and the rearward inclination section 33r in sequence from the forward side of the vehicle, and the drain hole 55 is formed in the protrusion apex section tp or the rearward inclination section 33r.

According to the configuration, since the drain hole 55 is formed in the protrusion apex section tp or the rearward inclination section 33r of the convex section 33, drainage can be performed by minimizing an influence due to the traveling air. That is, when the drain hole 55 is formed in the forward inclination section 33f facing the front of the vehicle, the traveling air from the front of the vehicle blows into the drain hole 55, and drainage is hindered. Such an influence is minimized by forming the drain hole 55 in the protrusion apex section tp or the rearward inclination section 33r. When the drain hole 55 is formed in the protrusion apex section tp (the lowermost end portion of the convex section 33), the water in the convex section 33 is easily drained even when the vehicle stops. Even when the drain hole 55 is formed in the rearward inclination section 33r, a suction effect due to traveling air is easily obtained, and occurrence of wind noise is minimized.

In addition, in the imaging unit 12 for a vehicle, in the convex section 33, the imaging lens 17B of the downward imaging device 17 is disposed at the same position as the protrusion apex section tp in the vehicle forward/rearward direction, and the drain hole 55 is disposed in the rearward inclination section 33r.

According to the configuration, in the convex section 33, the imaging lens 17B and the drain hole 55 can be disposed efficiently by being distributed on front and rear sides. Since the drain hole 55 is disposed behind the imaging lens 17B, the water is hard to adhere to the imaging lens 17B even when the water is drained from the drain hole 55.

In addition, in the imaging unit 12 for a vehicle, the drain hole 55 is formed at the center of the convex section 33 in the vehicle width direction, and the imaging lens 17B is provided to be deviated outward in the vehicle width direction with respect to the center of the convex section 33 in the vehicle width direction.

According to the configuration, since the drain hole 55 is formed at the center of the convex section 33 in the vehicle width direction, the drainage characteristics can be enhanced (drainage is easily performed) by making the drain hole 55 closer to the lowermost end portion of the convex section 33. Since the imaging lens 17B is provided to be deviated toward an outer side of the convex section 33 in the vehicle width direction, even when the air flow is disturbed by irregularities around the imaging lens 17B, an influence on the suction effect due to the traveling air flowing around the drain hole 55 is minimized.

In addition, in the imaging unit 12 for a vehicle, the imaging lens 15B of the rearward imaging devices 15 is disposed on the rear end portion of the housing 19, and the drain hole 55 and the imaging lens 15B are offset to each other in the vehicle width direction.

According to the configuration, since the drain hole 55 and the imaging lens 15B are offset in the vehicle width direction, even when the water drained from the drain hole 55 flows toward the rear end of the housing 19, the water is hard to adhere to the imaging lens 15B.

In addition, in the imaging unit 12 for a vehicle, the housing 19 includes the second drain hole 58 formed in the lower edge portion 19e provided in the lowermost end portion of the housing.

According to the configuration, the water remaining in the housing 19 without being discharged from the drain hole 55 reaches the lower edge portion 19e including the lowermost end portion of the housing 19 when the vehicle stops or the like, and is discharged to the outside of the housing 19 through the second drain hole 58. Accordingly, drainage characteristics of the housing 19 can be enhanced.

Further, the present invention is not limited to the embodiment, and for example, the convex section 33 is not limited to the configuration in which only the bottom housing 19b is formed, and for example, may be formed in the other housings 19i and 19o or may be formed to cross the plurality of housings. A shape of the convex section 33 is not limited to the embodiment, and for example, a shape of the embodiment may be reversed or may be a relatively simple shape such as a hemispherical shape. A shape, a position, a size, or the like, of each of the drain holes 55 and 58 is not limited to the embodiment, and for example an oval or square hole may be formed or a position thereof may be moved.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An imaging unit for a vehicle comprising:
   an imaging device configured to image an area outside of a vehicle; and
   a housing attached to a side portion of a vehicle body of the vehicle and configured to accommodate the imaging device,
   wherein the housing comprises a convex section formed by downwardly swelling a lower wall that faces a lower side of the vehicle, an exposure hole that is formed in a surface of the convex section and that is configured to expose the imaging device to outside of the vehicle body, and a drain hole formed in the convex section and configured to discharge water entered the housing to an outside of the housing.

2. The imaging unit for a vehicle according to claim 1, wherein the convex section has a streamline shape in which a longitudinal direction is oriented in a vehicle forward/rearward direction.

3. The imaging unit for a vehicle according to claim 1, wherein the convex section has a forward inclination section, a protrusion apex section and a rearward inclination section in sequence from a forward side of the vehicle, and
   the drain hole is provided in the protrusion apex section or the rearward inclination section.

4. The imaging unit for a vehicle according to claim 3, wherein, in the convex section, an imaging lens of the imaging device is disposed at a same position as the protrusion apex section in the vehicle forward/rearward direction, and the drain hole is disposed in the rearward inclination section.

5. The imaging unit for a vehicle according to claim 4, wherein the drain hole is formed at a center of the convex section in the vehicle width direction, and
   the imaging lens is provided to deviate outward in the vehicle width direction with respect to the center of the convex section in the vehicle width direction.

6. The imaging unit for a vehicle according to claim 1, wherein a rear imaging lens of the imaging device is disposed on a rear end portion of the housing, and
   the drain hole and the rear imaging lens are offset from each other in the vehicle width direction.

7. The imaging unit for a vehicle according to claim 1, wherein the housing includes a second drain hole formed in a lower edge portion provided in the lowermost end portion of the housing.

* * * * *